United States Patent [19]
White

[11] Patent Number: 5,756,061
[45] Date of Patent: May 26, 1998

[54] DIAMOND SYNTHESIS FROM SILICON CARBIDE

[76] Inventor: John L. White, 6302 Lakeview Dr., Falls Church, Va. 22041

[21] Appl. No.: 796,932

[22] Filed: Nov. 25, 1991

Related U.S. Application Data

[63] Continuation-in-part of Ser. No. 611,792, Nov. 13, 1990, abandoned.

[51] Int. Cl.$^6$ .............................. C01B 31/06; B01J 3/06
[52] U.S. Cl. .............................. 423/446; 117/6
[58] Field of Search .............................. 423/446; 117/6

[56] References Cited

U.S. PATENT DOCUMENTS

| | | | |
|---|---|---|---|
| 4,228,142 | 10/1980 | Holocombe, Jr. et al. | 423/446 |
| 4,485,080 | 11/1984 | Shingh et al. | 423/446 |
| 4,803,123 | 2/1989 | Harada | 423/447.1 |
| 5,128,080 | 7/1992 | Jurewicz et al. | 423/446 |

FOREIGN PATENT DOCUMENTS

| | | | |
|---|---|---|---|
| 252685 | 5/1963 | Australia | 423/446 |
| 643290 | 6/1962 | Canada | 423/446 |
| 49-2410 | of 1972 | Japan | 423/446 |
| 971943 | 10/1964 | United Kingdom | 423/449 |

*Primary Examiner*—Michael Lewis
*Assistant Examiner*—Stuart L. Hendrickson

[57] ABSTRACT

Diamonds are synthesized from SiC at temperatures and/or pressures lower than those required to convert amorphous carbon or graphite to diamond, by heating the SiC in the absence of another non-diamondaceous source of elemental carbon and in the presence of a reactant which selectively reacts with the Si at the temperature to which the SiC is heated, and in a matrix which is frangible when cooled, while the Sic is within the diamond stable region of the diamond-graphite phase diagram, thereby permitting the diamond to be separated therefrom by physical means.

20 Claims, No Drawings

5,756,061

1

DIAMOND SYNTHESIS FROM SILICON CARBIDE

This is a continuation-in-part of application Ser. No. 07/611,792, filed Nov. 13, 1990, now abandoned.

BACKGROUND OF THE INVENTION

This invention relates to a method for the synthesis of diamonds from a non-carbonaceous, i.e., non-elemental carbon, source.

The commercial method currently employed for the synthesis of diamonds is the ultra high temperature, ultra high pressure method employing as starting material a non-diamondaceous form of elemental carbon (elemental carbon in a non-diamond form) as starting material first developed in the 1950s by General Electric Company. Nature, 176:51-54 (1956); ibid, 184:1094-8 (1959). See, also, U.S. Pat. Nos. 2,941,248; 2,981,861; 2,947,608; 2,947,609, 2,947,610 and 2,947,611. Techniques were later developed which improved one or more of the reaction conditions or reactors required, the rate of diamond production and the quality of the diamonds produced employing this approach. See, e.g., U.S. Pat. Nos. 3,031,269; 3,325,245; 3,297,407; 4,034,066; 4,322,391; 4,485,080; 4,836,881 and other patents relating to diamond production presently classified in Class 423, subclass 446 by the U.S. Patent and Trademark Office.

Another approach to the production of carbon in the diamond crystal form is the chemical vapor deposition technique (CVD) process first reported in the 1940s which employs an organic carbon compound, e.g., methane, rather than elemental carbon, as the starting material, and subatmospheric pressure. Until recently, this process was ignored as a commercially feasible method for producing diamonds because of the minuscule rate of diamond production. However, recent interest in producing continuous diamond films on such diverse surfaces as paper and silicon has renewed interest in this approach. See Science News, 138, 72 (Aug. 4, 1990).

Attempts to produce diamonds without the necessity of applying the enormous pressures employed in the General Electric Company approach has been attempted with little or no success for over 80 years. See, e.g., Barton, C. V., Nature, 72, No. 1869 (Aug. 24, 1905); Peterson, J., Science Newsletter, Aug. 3, 1985, page 75; British Specification No. 377,239 (1932). U.S. Pat. Nos. 1,637,291, 3,305,254 and 4,485,080 claim such processes (the latter producing diamond powder), involving the solution of and the precipitation of carbon from a molten metal. This approach suffers from the inherent serious commercial disadvantage of requiring the dissolution of the metal containing the diamond powder with strong acid and/or alkali in order to isolate the thus-produced diamonds.

Brannon, C. J., Poster Presentation, Second International Conference on the New Diamond Science & Technology, Washington, D.C., Sep. 23-27 (1990), Japanese Patent 47-2410 and Canadian Patent 643,290 disclose the use of SiC and other carbon sources other than graphite for the synthesis of diamonds.

U.S. Pat. No. 4,228,142 claims a process for producing "diamond-like" carbon particles by reacting silicon carbide or a silicon carbide precursor at atmospheric pressure with a fluorocarbon. U.S. Pat. No. 4,275,050 discloses the production of ultra-hard particles "composed substantially of carbon" by the reaction of $Al_4C_3$ or $Be_2C$ with an organic halide. Although these processes have the advantage of

2 being able to be conducted at atmospheric pressure, neither patent claims that true diamonds are produced nor would one expect them to be produced under the conditions employed, since there is little, if anything, thermodynamically inhibiting the concurrent formation of other crystalline and amorphous forms of carbon.

Although the rate of production and quality of the diamonds produced by the General Electric ultra high pressure, high temperature graphite to diamond approach have been developed, it would be desirable if a method were available which produced commercial abrasive and/or gem quality diamonds which did not require either the ultra high pressures or temperatures and the resulting sophisticated crucible materials and apparatus required to survive at the temperatures and pressures required to convert non-diamondaceous elemental carbon to diamonds by the General Electric approach or the commercially unattractive necessity of dissolving the metal matrix in which the diamonds are produced in the atmospheric pressure, carbon-in-metal solution approach or the inherent limitation on the rate of diamond production associated with the CVD subatmospheric approach.

It is an object of this invention to provide a novel process for the synthesis of diamonds which does not have these disadvantages. It is another object to provide a novel method for the production of diamonds. Other objects will be apparent to those skilled in the art.

SUMMARY OF THE INVENTION

This invention relates to an improvement in the process for the production of a synthetic diamond wherein silicon carbide as the sole non-diamondaceous form of carbon is heated while in the diamond-stable region of the pressure-temperature phase diagram for carbon under conditions which separates the silicon of the silicon carbide from the carbon thereof, the thus-produced synthetic diamond is cooled to ambient temperature while it is maintained in the diamond stable region of the diamond-graphite diagram; and the thus-produced synthetic diamond is isolated from the reaction product; which process comprises heating the silicon carbide to a temperature of up to 1,200° C., but below the temperature at which elemental carbon is converted from a non-diamondaceous form to synthetic diamond under the conditions employed, in the presence of a reactant which chemically reacts with the silicon selectively and in a matrix which forms a frangible reaction product when cooled, whereby the carbon which is thus separated from the silicon carbide is converted to synthetic diamond, and isolating the synthetic diamond by physical means.

DETAILED DISCLOSURE

The essential starting material for this invention is silicon carbide, preferably β-silicon carbide. For a description of its preparation, see U.S. Pat. Nos. 2,913,313; 3,025,192, 3,053, 635; 3,228,756; 3,615,930; and 4,228,142, whose disclosures are incorporated herein by reference.

An essential aspect of the process of this invention is that the silicon atoms of the SiC are disassociated from the carbon atoms of the SiC in the absence of other sources of non-diamondaceous elemental carbon, which distinguishes the instant process dramatically from those in which a source of non-diamondaceous form of elemental carbon is essential to the process, e.g., the General Electric process and the process of U.S. Pat. No. 4,228,142, which requires both SiC and a fluorocarbon, and U.S. Pat. No. 2,734,799, which employs amorphous carbon, a metal carbide, such as SiC as a nucleating agent and $Cl_2$, to produce graphite at atmospheric pressure, and the CVD process, which at subatmospheric pressure employs an organic compound, such as methane, as the carbon source.

The process can be and preferably is conducted in the presence of diamondaceous carbon as a nucleating agent, e.g., a single diamond crystal when gem diamonds are to be produced (U.S. Pat. No. 4,836,881) or diamond powder when commercial grade abrasive diamonds are to be produced.

The process of this invention is conducted at a temperature/pressure relationship below that required to convert non-diamondaceous elemental carbon, i.e., amorphous carbon or graphite, to the diamond form. The reaction temperation is determined by the manner in which the silicon is disassociated from the carbon in the silicon carbide. Silicon carbide is in equilibrium with Si and C above about 2,200°. The disassociation could therefore be accomplished at about 2,200°–2,400° by withdrawing the Si from the reaction vessel as it is formed in a stream of an inert gas, e.g., He. However, to be commercially feasible, reaction temperatures between about 800° and 1,200°, e.g., 1,000°–1,200°, are employed and the reaction is conducted in the presence of reactant which reacts with the Si. For a discussion of such reactants, see Sneid & Brasted, "Comprehensive Inorganic Chemistry", Vol. 7, Chap. 73, page 546, and Ramsdell, Am. Mineralogist, 29, 327–9, 431–2 (1944). Examples of such reactants are metal salts, metal oxides and hydroxides, e.g., one or more of the oxides of Group IIA metals, e.g., BaO, CaO & MgO; of the Group IA metals, e.g., $Na_2O$ and $K_2O$; of the Group VIII metals, e.g., $Fe_2O_3$, $Al_2O_3$ and MnO; cryolite ($Na_3AlF_6$), anhydrous borax ($N_2B_4O_7$), NaOH, KOH, KF and NaF.

If $Cl_2$ or HCl is employed as the reactant for the Si, it can be employed as a gaseous stream thereof or in admixture with an inert gas, e.g., He. If the SiC is present in a matrix of one or more metal oxides, conditions must be employed which do not cause the metal oxide to react with the Si to form oxygen, which can react with the C to form CO or $CO_2$ (see U.S. Pat. No. 2,734,799).

The Si in the SiC will also react with metals, e.g., Fe, at temperatures below 2,200°. Therefore, the reactant for the Si can also be a metal. However, if the process is conducted in the presence of a metal, e.g., iron or lead, in order to form a molten matrix or as a reactant for the Si, to avoid the necessity of the use of strong acid or alkali to isolate the thus-produced diamonds, the metal is employed in admixture with enough of a compound, e.g., a metal oxide, which renders the matrix frangible when cooled, so that the diamonds can be separated therefrom by physical rather than chemical means. Examples of such mixtures are Fe and a metal oxide, e.g., $Fe_2O_3$, BaO, CaO, MgO and $Al_2O_3$; Al and $Al_2O_3$; Mg and MgO compounds and mixtures of compounds which can be used to form a molten matrix are 24.2 $Na_2O$, 35.2 $B_2O$, 40.6 $SiO_2$ (570°); 23.7 $K_2O$, 37.2 $B_2O$, 39.1 $SiO_2$ (655°); 2 PbO—$SiO_2$ (746°); 76.5 BaO; 23.5 $B_2O_3$ (750°); 55.0 $K_2O$, 45.0 $SiO_2$ (780°); $Na_2O \cdot 2SiO_2$ (874°); $K_2B_2O_4$ (947°); $K_2O \cdot 2SiO_2$ (1,041°); $Mg_2Al_4Si_5O_{18}$ (1,087°); $Na_2O \cdot SiO_2$ (1,088°); $Na_2 \cdot Al_2O_3 \cdot 6SiO_2$ (1,100°); $CaO \cdot MgO \cdot Al_2O_3$; and various other fusible minerals, e.g., those commonly used in ceramics.

The pressure employed in the process of this invention, although dependent on the reaction temperature employed, is, for temperatures above 927°, at least that required to maintain the contents of the reaction vessel above the Berman-Simon line, i.e., at least $P=7000+27$ T, where P is pressure in atmospheres and T is degrees Kelvin, i.e., the pressure required to maintain the carbon in the diamond stable phase of the diamond-graphite phase diagram during the heating step of the process, which pressure is significantly less than that required to convert graphite to diamond at the selected reaction temperature. Thus, whereas a GPa equiv. pressure of about 50–60 kb (5–6 GPa) is conventionally employed when starting with graphite, the minimum pressure required in the process of this invention is merely that required to maintain contents of the reaction vessel within the diamond stable phase, e.g., less than 40 kb (at up to 1200°), e.g., about 30–50 kb, if that step is conducted above about 927°. If the disassociation reaction is conducted below that temperature, the pressure need be only that required to thermodynamically inhibit the concurrent formation of non-diamondaceous forms of carbon.

The optimum pressure for any selected reaction temperature, media and reactant can readily be determined by a few preliminary trial experiments.

In some instances, a change in the volume of the contents of the reaction vessel may occur during the heating thereof during the disassociation step, e.g., when a sinter of the SiC and a ceramic matrix liquifies. If so, care must be taken that the resulting drop in pressure does not fall to below the diamond stable region.

Examples of apparatus which can be employed in practicing the process of this invention are those described in U.S. Pat. Nos. 4,836,881; 4,322,396; 4,430,051; 3,423,177; 3,346,102; 3,317,035; 3,303,053; 3,297,407; 2,995,776; 2,941,252; and 2,941,248. When a gaseous reactant, e.g., $Cl_2$ or HCl, is employed to disassociate the Si from the SiC by reaction therewith, such apparatus is modified by the addition of a gas inlet and a gas outlet adapted to deliver the gaseous stream to the SiC and exhaust it therefrom the reaction vessel at the pressure employed in the reaction which, along with the gas inlet and outlet pipes, must be constructed of a material which not only will maintain its structural integrity at the temperatures and pressures to which they are subjected but also must be chemically inert to the gaseous reactant, e.g., gold, platinum or infusible ceramic plated stainless steel.

The temperature employed in the process of this invention is that required to separate the Si from the SiC, thereby forming nascent atomic carbon which, because the contents of the reactor is within the diamond stable region of the diamond-graphite phase diagram, is converted spontaneously to the diamond form thereof. The highest temperature employed ordinarily is less than 1,200°, e.g., between about 800° and 1,200°, preferably below 1,100°, e.g. below 927°. Ordinarily, however, a substantially lower temperature is preferred. Therefore, the disassociation is preferably accomplished by a reactant which reacts preferentially with the Si. Depending on the reactant selected, temperatures of 800° C. or even lower are operable. For example, CaO, MgO, $Na_2B_4O_7$ and $Na_3AlF_3$ react with SiC at about 1,000°–1,300°; sodium silicate at about 1,350°; and alkalis at lower temperatures. Whatever the reactant employed, it is critical that the pressure when the reaction occurs is sufficient to maintain the reaction mixture in the diamond stable region. Therefore, that pressure is ordinarily imparted to the reactants, e.g., at ambient temperature, before the reactants are heated.

The temperature required to achieve the desired reaction can be determined from standard inorganic reference texts or by a few preliminary experimental trial runs.

It is desirable to approach the reaction temperature slowly, particularly when a single crystal or a plurality of larger crystals are desired.

The formation of the diamond or diamonds can be facilitated by the presence of one or more diamond nuclei in the reaction mixture and/or by the presence of a known catalyst for the formation of the diamond form, e.g., Ni, Co, Pt or Cu.

The reaction temperature can be achieved conventionally, e.g., by an electric current passed through the reaction vessel, or by a laser beam passed through a crystal window in the reaction wall which is transparent to the laser energy and which maintains its structural integrity at the reaction temperature employed.

Contemplated equivalents of the process of this invention are those employing another carbide, e.g., calcium carbide, from which the carbon thereof can be dissociated from the metal component thereof, within the diamond stable region of the diamond-graphite phase diagram, in the absence of another non-diamondaceous source of elemental carbon.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, are hereby incorporated by reference.

EXAMPLES

Example 1

In a reaction vessel described in U.S. Pat. No. 3,030,662 or the modification thereof described in U.S. Pat. No. 4,322,396, place a reaction mixture of 1 part by weight β-SiC and 2 parts by weight each of MgO and FeO under a pressure sufficient to maintain the C in the diamond stable region, viz., 40 kb, heat to 1,200°; maintain the mixture at that temperature and pressure for two days; and then cool the mixture to ambient temperature while under that pressure. The carbon in the solid matrix is in the diamond form and is isolated by conventional physical method employed to isolate natural diamonds for ore bearing them.

Example 2

Repeat the process of Example 1, using a mixture of equal parts of SiC and cryolite.

Example 3

Repeat the process of Example 1, using SiC and a large weight excess of powdered iron. Heat to about 1,000° until reaction occurs.

Example 4

Repeat the process of Example 1, using SiC and a large weight excess of $NaB_4O_7$. Heat to a temperature of about 800° until reaction occurs.

Example 5

Repeat the process of Example 1, using SiC and a large weight excess of $Na_2B_2O_4$. Heat to a temperature of of 975° or until reaction occurs.

Example 6

Repeat the process of Example 1, using SiC and a large weight excess of a ceramic clay. Heat to 1,250°–1,450°.

Example 7

Repeat the procedure of Example 1, using a mixture of SiC and one or more of NaOH, KOH, $Ba(OH)_2$, $Ca(OH)_2$, $Mg(OH)_2$, $Na_2O$, $K_2O \cdot CaO$, BaO or MgO.

In separate runs, conduct the reaction at lower temperatures, in increments of 100°, until the C in the SiC is no longer competely converted to its diamondaceous form.

Examples 8–14

Follow the procedures of Examples 1–7, at successively lower pressures, in increments of 5,000 atmospheres, viz, at 35, 30, 25, 20, 15, 10, 5 atmospheres and ambient pressure, until the C in the SiC is no longer converted solely to the diamondaceous form.

The preceding examples can be repeated with similar success by substituting the generically or specifically described reactants and/or operating conditions of this invention for those used in the preceding examples.

From the foregoing descriptions, one skilled in the art can easily ascertain the essential characteristics of this invention, and without departing from the spirit and scope thereof, can make various changes and modifications of the invention to adapt it to various usages and conditions.

What is claimed is:

1. In a process for the production of synthetic diamonds wherein silicon carbide as the sole non-diamondaceous source of carbon is heated at super-atmospheric pressure while in the diamond-stable region of the pressure-temperature diamond-graphite phase diagram for carbon under conditions which separates the silicon atoms of the silicon carbide from the carbon atoms thereof and the carbon atoms are converted to synthetic diamond, the thus-produced synthetic diamond is cooled to ambient temperature while it is maintained in the diamond stable region of the diamond-graphite phase diagram; and the thus-produced synthetic diamond is isolated from the reaction product; the improvement which comprises heating the silicon carbide to a temperature of up to 1,200° C. but below the temperature at which a non-diamondaceous form of elemental carbon is converted to synthetic diamond under the conditions employed, in a matrix which contains a reactant which chemically reacts selectively with the silicon atoms of the silicon carbide and which forms a frangible reaction product when cooled, whereby the carbon atoms which are thus separated from the silicon carbide are converted to synthetic diamond at a temperature below that required to convert elemental carbon to synthetic diamond under the conditions employed; and isolating the synthetic diamond from the frangible reaction product by physical means.

2. A process according to claim 1, wherein the silicon carbide has the beta crystalline form.

3. A process according to claim 1, wherein the temperature employed is below that at which a non-diamondaceous form of elemental carbon is converted by heating to diamond at any pressure.

4. A process according to claim 3, wherein the temperature is between about 800° and 1,200° C.

5. A process according to claim 1, wherein the silicon carbide is reacted with a metal oxide or a metal salt.

6. A process according to claim 1, wherein the reactant is a metal hydroxide.

7. A process according to claim 6, wherein the reactant is sodium hydroxide.

8. A process according to claim 1, wherein the reactant is a metal oxide.

9. A process according to claim 8, wherein the reactant is an alkali metal oxide or an alkaline earth oxide.

10. A process according to claim 8, wherein the metal oxide is an oxide of calcium, magnesium, aluminum, sodium or potassium.

11. A process according to claim 10, wherein the oxide is $K_2O$.

12. A process according to claim 10, wherein the oxide is CaO.

13. A process according to claim 1, wherein the reaction is conducted in a molten vehicle.

14. A process according to claim 1, wherein the reaction is conducted at a temperature below 927° C.

15. A process according to claim 1, wherein the silicon carbide is subjected to a pressure of less than 40,000 atmospheres before the silicon is separated from the carbon.

16. A process according to claim 1, wherein the reaction is conducted at a temperature of at least 800° C.

17. A process according to claim 13, wherein the molten vehicle comprises iron.

18. A process according to claim 1, wherein the matrix includes diamondaceous carbon as a nucleating agent.

19. A process according to claim 18, wherein the diamondaceous carbon nucleating agent is powdered diamond.

20. A process according to claim 1, wherein the reaction is conducted at a temperature below 927° C. in a molten matrix of the reactant.

* * * * *